(12) United States Patent
Müller et al.

(10) Patent No.: US 12,005,780 B2
(45) Date of Patent: Jun. 11, 2024

(54) OPERATOR CONTROL DEVICE FOR OPERATING AN INFOTAINMENT SYSTEM, METHOD FOR PROVIDING AN AUDIBLE SIGNAL FOR AN OPERATOR CONTROL DEVICE, AND MOTOR VEHICLE HAVING AN OPERATOR CONTROL DEVICE

(71) Applicant: AUDI AG, Ingolstadt (DE)

(72) Inventors: Ulrich Müller, Ingolstadt (DE); Andreas Spahmann, Bad Wimpfen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/912,323

(22) PCT Filed: Mar. 16, 2021

(86) PCT No.: PCT/EP2021/056613
§ 371 (c)(1),
(2) Date: Sep. 16, 2022

(87) PCT Pub. No.: WO2021/185801
PCT Pub. Date: Sep. 23, 2021

(65) Prior Publication Data
US 2023/0158886 A1    May 25, 2023

(30) Foreign Application Priority Data
Mar. 17, 2020  (DE) .................. 102020107338.0

(51) Int. Cl.
*G06F 17/00* (2019.01)
*B60K 35/00* (2006.01)
(Continued)

(52) U.S. Cl.
CPC .............. *B60K 35/00* (2013.01); *G06F 3/016* (2013.01); *G06F 3/0412* (2013.01);
(Continued)

(58) Field of Classification Search
CPC ............ B60K 35/00; B60K 2370/1438; B60K 2370/157; B60K 2370/158;
(Continued)

(56) References Cited

U.S. PATENT DOCUMENTS

| | | | |
|---|---|---|---|
| 7,415,352 B2 * | 8/2008 | Olcott | B60K 35/00 715/862 |
| 8,482,535 B2 * | 7/2013 | Pryor | B60K 37/06 345/173 |

(Continued)

FOREIGN PATENT DOCUMENTS

| | | |
|---|---|---|
| CN | 105759956 A | 7/2016 |
| CN | 107209634 A | 9/2017 |

(Continued)

OTHER PUBLICATIONS

Genesis-GV70-Quick-Reference-Guide (Year: 2022).*
(Continued)

*Primary Examiner* — Ronnie M Mancho
(74) *Attorney, Agent, or Firm* — STAAS & HALSEY LLP

(57) ABSTRACT

A method and an operator control device operate an infotainment system. The operator control device has a control unit, an audio device, an actuating element, and a touch-sensitive display device, which is mounted so as to be movable and is designed to display at least one graphical control element. The touch-sensitive display device moves during an actuating action and thus activates the actuating element. The control unit determines an actuation position of the actuating action on the touch-sensitive display device when the actuating element is activated and compares said actuation position with a display position of the at least one
(Continued)

graphical control element. The audio device is actuated to output an audible signal when the actuation position matches the display position.

20 Claims, 2 Drawing Sheets

(51) Int. Cl.
| | |
|---|---|
| *G06F 3/01* | (2006.01) |
| *G06F 3/041* | (2006.01) |
| *G06F 3/0488* | (2022.01) |
| *G06F 3/16* | (2006.01) |
| *B60K 35/10* | (2024.01) |
| *B60K 35/25* | (2024.01) |
| *B60K 35/26* | (2024.01) |
| *B60K 35/28* | (2024.01) |

(52) U.S. Cl.
CPC ............ *G06F 3/0488* (2013.01); *G06F 3/165* (2013.01); *B60K 35/10* (2024.01); *B60K 35/25* (2024.01); *B60K 35/26* (2024.01); *B60K 35/28* (2024.01); *B60K 2360/1438* (2024.01); *B60K 2360/164* (2024.01); *G06F 2203/04105* (2013.01)

(58) Field of Classification Search
CPC ........ B60K 2370/164; B60K 2370/128; B60K 2370/145; B60K 37/06; B60K 2370/143; G06F 3/016; G06F 3/0412; G06F 3/0488; G06F 3/165; G06F 2203/04105; G06F 3/0482; G06F 3/04842; G06F 3/167
USPC .......................................................... 701/36
See application file for complete search history.

(56) References Cited

U.S. PATENT DOCUMENTS

| | | | | |
|---|---|---|---|---|
| 8,532,678 | B2* | 9/2013 | Geelen | G08G 1/005 |
| | | | | 455/457 |
| 8,610,674 | B2* | 12/2013 | Pryor | G06F 3/016 |
| | | | | 345/173 |
| 9,187,038 | B2* | 11/2015 | Patel | B60K 35/00 |
| 9,513,744 | B2* | 12/2016 | Pryor | B60K 37/06 |
| 9,589,392 | B2* | 3/2017 | Wäller | B60K 37/06 |
| 9,666,079 | B2* | 5/2017 | Lokesh | B60W 30/16 |
| 9,975,742 | B1* | 5/2018 | Mason | B66D 1/46 |
| 10,209,832 | B2* | 2/2019 | Iyer | B60K 35/00 |
| 10,402,040 | B2* | 9/2019 | Langlois | G06F 3/0481 |
| 10,410,319 | B2* | 9/2019 | Wunderlich | B60W 50/10 |
| 10,592,092 | B2* | 3/2020 | Washeleski | G06F 3/04886 |
| 10,606,378 | B2* | 3/2020 | Rao | G06F 9/451 |
| 10,647,237 | B2* | 5/2020 | Song | B60W 10/30 |
| 10,705,719 | B2* | 7/2020 | Jakowitz | G06F 3/167 |
| 10,732,829 | B2* | 8/2020 | Fleizach | G06F 3/0481 |
| 10,860,192 | B2* | 12/2020 | Feit | B60K 35/00 |
| 10,960,898 | B2* | 3/2021 | Palzer | G06F 9/453 |
| 11,199,906 | B1* | 12/2021 | Curtis | G06F 1/1626 |
| 2002/0111715 | A1* | 8/2002 | Richard | B60R 16/0231 |
| | | | | 701/1 |
| 2004/0032395 | A1* | 2/2004 | Goldenberg | G06F 3/0362 |
| | | | | 345/156 |
| 2008/0109132 | A1* | 5/2008 | Yukawa | G06F 3/0482 |
| | | | | 701/36 |
| 2011/0265003 | A1* | 10/2011 | Schubert | G06F 3/048 |
| | | | | 715/781 |
| 2013/0245882 | A1* | 9/2013 | Ricci | G06F 3/0486 |
| | | | | 701/36 |
| 2014/0095020 | A1* | 4/2014 | Obradovich | B60K 37/06 |
| | | | | 701/36 |
| 2014/0309886 | A1* | 10/2014 | Ricci | G07C 5/0833 |
| | | | | 701/41 |
| 2014/0365120 | A1* | 12/2014 | Vulcano | G01C 21/3611 |
| | | | | 701/532 |
| 2015/0232065 | A1* | 8/2015 | Ricci | H04W 4/48 |
| | | | | 701/36 |
| 2018/0373350 | A1* | 12/2018 | Rao | B60K 35/00 |
| 2020/0057546 | A1* | 2/2020 | Zhao | G06F 3/017 |

FOREIGN PATENT DOCUMENTS

| | | | | |
|---|---|---|---|---|
| CN | 107635818 | A | 1/2018 | |
| CN | 107810123 | A | 3/2018 | |
| DE | 10304704 | A1 | 8/2004 | |
| DE | 10 006 021 593 | A1 | 11/2007 | |
| DE | 102009013440 | A1 | 9/2009 | |
| DE | 102009036860 | A1 | 3/2011 | |
| DE | 10 2010 026 910 | A1 | 8/2011 | |
| DE | 102010026910 | A1 | 8/2011 | |
| DE | 102011018897 | A1 | 10/2012 | |
| DE | 102013020990 | A1 | 6/2015 | |
| DE | 102013020992 | A1 | 6/2015 | |
| DE | 102017104784 | A1 | 9/2018 | |
| DE | 2020 107 338.0 | | 3/2020 | |
| EP | 2246770 | A2* | 11/2010 | ............ G01C 21/36 |
| EP | 3043240 | A1 | 7/2016 | |
| WO | WO 2013/029083 | A1 | 3/2013 | |
| WO | WO 2016/016521 | A1 | 2/2016 | |
| WO | WO 2019/101879 | A1 | 5/2019 | |
| WO | PCT/EP2021/056613 | | 3/2021 | |

OTHER PUBLICATIONS

German Search Report, dated Apr. 30, 2021, in Germany Patent Application No. 102020107338.0 (5 pp.).
International Search Report, dated Jun. 30, 2021, in International Patent Application No. PCT/EP2021/056613 (15 pp.).
Form PCT/IPEA/408, dated Sep. 16, 2021, in International Application No. PCT/EP2021/056613 (8 pp.).
Form PCT/IPEA/416, dated Apr. 11, 2022, in International Patent Application No. PCT/EP2021/056613 (1 pp.).
Form PCT/IPEA/409, dated Apr. 11, 2022, in International Patent Application No. PCT/EP2021/056613 (14 pp.).
Extended European Search Report, dated May 19, 2022, in European Patent Application No. 21716600.8 (4 pp.).
Form PCT/IB/338 Notification of Transmittal of Translation of the International Preliminary Report on Patentability, dated Sep. 22, 2022, in International Patent Application No. PCT/EP2021/056613 (1 pg.).
Translation of International Preliminary Report on Patentability, dated Sep. 22, 2022, in International Patent Application No. PCT/EP2021/056613 (10 pg.).
Chinese Office Action dated Mar. 3, 2023 for parallel Chinese Application No. 202180013013.0.

* cited by examiner

OPERATOR CONTROL DEVICE FOR OPERATING AN INFOTAINMENT SYSTEM, METHOD FOR PROVIDING AN AUDIBLE SIGNAL FOR AN OPERATOR CONTROL DEVICE, AND MOTOR VEHICLE HAVING AN OPERATOR CONTROL DEVICE

This application is a U.S. national stage of International Application No. PCT/EP2021/056613, filed on Mar. 16, 2021. The International Application claims the priority benefit of German Application No. 10 2020 107 338.0 filed on Mar. 17, 2020. Both the International Application and the German Application are incorporated by reference herein in their entirety.

BACKGROUND

Described below is an operator control device for operating an infotainment system, a motor vehicle having such an operator control device and a method for providing an audible signal for an operator control device.

Operator control devices having a touch-sensitive display device for operating an infotainment system, in particular an infotainment system of a vehicle, that provide a user with audible or haptic feedback during operation are known, the haptic feedback being generated by an actuator, for example. A touch-sensitive display device is for example a touchscreen that is able to be used to display graphical control elements of the infotainment system. One disadvantage is that, for example, the actuator system for generating the haptic feedback includes very complex and expensive mechanical elements. A disadvantage of purely audible feedback is that a user does not receive any haptic feedback.

DE 10 2006 021 593 A1 discloses a vehicle function controller, in particular for controlling comfort functions. The controller is designed in such a way that it takes selection options displayed in a display device as a basis for assigning a function-dependent mechanical and/or aural feedback signal from the actuator.

DE 10 2013 020 990 A1 discloses a motor vehicle and a method for providing a predetermined audible signal for a control element.

WO 2019/101879 A1 discloses a transparent switch for integration into a display, wherein mechanical feedback is provided for important user inputs.

SUMMARY

Described below is an inexpensive operator control device that provides a user with haptic and audible feedback when it is actuated.

An operator control device described below operates an infotainment system or another vehicle system, such as e.g. air conditioning functions, vehicle functions, seat settings, etc.

The operator control device includes a touch-sensitive display device, which is mounted so as to be movable and is to display at least one graphical control element. Furthermore, the operator control device includes a control unit, an audio device and an actuating element. The touch-sensitive display device is to move during an actuating action and thus to activate the actuating element, wherein the control unit is to determine an actuation position of the actuating action on the touch-sensitive display device when the actuating element is activated and to compare said actuation position with a display position of the at least one graphical control element. The control unit is also designed to actuate the audio device to output an audible signal when the actuation position matches the display position.

In other words, the touch-sensitive display device, which may be a touchscreen, is able to be pressed like a switch or button and thus activate the actuating element. For example, the actuating element may include a mechanical key, capacitive distance sensors, inductive sensors, strain gages, piezo elements or films. An actuating action may mean, for example, the touch-sensitive display device is pressing on the actuating element, as a result of which the latter is activated and, for example, provides an electrical signal. The display device may be movable, for example, in such a way that, after overcoming one mechanical resistance, it is able to be moved a predefined distance in one direction before it encounters another mechanical resistance that stops the movement. This means that perceptible haptics may be generated by moving or shifting the display device.

Furthermore, the activation of the actuating element may result in a control unit determining an actuation position of the actuating action, that is to say the pressure point on the touch-sensitive display device, and comparing whether there is a graphical control element in this actuation position. This means that a check is performed to determine whether a display position of at least one graphical control element matches the actuation position. When this is the case, the control unit is able to actuate an audio device so that an audible signal is output. Thus, haptic feedback may be provided by moving the display device and audible feedback may be provided by playing back the audible signal. An advantage of this is that the operator control device does not have to be operated visually, since a user is provided with feedback by feeling and hearing that his actuating action has been carried out and whether it was successful. This is particularly advantageous for an application in a vehicle, as it eliminates the need to take one's eyes off a road. A user also senses haptic feedback much more intensely when the user hears audible feedback at the same time, since the haptic feeling is heavily influenced by acoustics. For example, the audio device may be one or more loudspeakers, which play back the audible signal as a sound such as a click.

An advantage is that an inexpensive operator control device may be provided that allows a user to clearly distinguish whether or not a function of a graphical control element has been triggered. Since the operator control device can thus be operated "blind", safety while driving may also be increased. The user is intuitively able to distinguish whether the user has operated a graphical control element on the touchscreen (touch-sensitive display device) or whether the user has pressed beside the graphical control element. This can reduce distraction while driving. Furthermore, the operator control device described is significantly cheaper than other complex solutions.

One embodiment provides for the actuating element to provide a silent haptic actuating effect. This means that the actuating element provides a user with haptic feedback, for example because actuating it results in a resistance occurring that shows the user whether the actuating element has been activated. However, the actuating element itself should produce a sound neither actively nor passively. For example the actuating element may limit or stop the movement of the display device, the activation of the actuating element being triggered by the display device striking the actuating element. This has the advantage that a user is provided with audible feedback only when the display position of the graphical control element has been hit by the actuating action. This allows irritations for the user to be avoided.

The actuating element includes a pushbutton, in particular a micro-pushbutton, which is activated by depressing it and thus generates an electronic signal, for example, the electronic signal causing the control unit to carry out the position check for the actuation position and the display position. This results in the advantage that a pushbutton is an inexpensive way of detecting a movement of the display device by depressing the pushbutton.

A further embodiment provides for the actuating element to measure a pressure caused by the actuating action and to generate a pressure-dependent control signal, and for the audio device to adjust a volume of the audible signal on the basis of the pressure-dependent signal. In other words, the actuating element is able to measure a pressure or a force with which the actuation takes place. A pressure-dependent control signal may then be generated that includes information about the magnitude of the pressure, or the force, it being possible for a volume of the audible signal to be adjusted using the information in the pressure-dependent signal. A capacitive or inductive pressure sensor may be used for this purpose, for example, which may also be provided in a pushbutton, for example. This embodiment results in the advantage that a user is also provided with feedback about a strength of the pressure on the display device.

In a further embodiment, the control unit may also actuate the audio device to output an audible error signal when the actuation position does not match the display position when the actuating element is activated. This means that an error signal, which may differ from the audible signal, is output when a user presses beside the display position of the graphical control element. This embodiment results in the advantage that a user operating the operator control device blind is provided with audible feedback when the graphical control element was not hit, whereupon the user is able to adjust the actuation position.

A further embodiment provides for the control unit to also actuate the infotainment system to perform a function assigned to the graphical control element when the actuating element is activated and when the actuation position matches the display position. In other words, in addition to an audible signal being generated, a function of the infotainment system that is displayed by the graphical control element may be performed at the same time. The graphical control element is able to display a navigation symbol, for example, and actuation of this navigation symbol allows a navigation mode to be started in addition to the audible signal.

The control unit may also actuate the infotainment system to perform a function assigned to the graphical control element on the basis of the pressure-dependent signal. This means that when there is increased pressure on the display device, for example, a function of the graphical control element may be varied on the basis of the magnitude of the pressure. For example, an increased pressure allows a higher variation interval to be produced when setting a temperature for an air conditioning system. For example, the temperature may be adjusted in 0.5 degree Celsius increments at low pressure and in 2 degree Celsius increments at a higher pressure.

In a further embodiment, the touch-sensitive display device may be mounted so as to be movable to be designed to move perpendicularly to a display area of the display device as a whole in the direction of the actuating element or to incline itself about an axis of inclination in the direction of the actuating element. This means that the touch-sensitive display device may be designed as a large key that is movable in the direction of the actuating element. Alternatively, the display device may be designed as a large switch that is rotatable about an axis of inclination, a rotation about the axis of inclination resulting in the actuating element being activated. In this case, the axis of inclination may be provided horizontally in a center of the display device, for example. This embodiment results in the advantage that a user is provided with improved haptic feedback during an actuating action.

A method provides an audible signal for an operator control device, wherein the operator control device includes a touch-sensitive display device, which is mounted so as to be movable and is designed to display at least one graphical control element. The method includes, as step a), activating an actuating element by moving the touch-sensitive display device during an actuating action, as step b), determining an actuation position of the actuating action when the actuating element is activated on the touch-sensitive display device, as step c), comparing the actuation position with a display position of the at least one graphical control element and, as step d), providing an audible signal when the result of the comparison of the actuation position with the display position is that the actuation position matches the display position. This results in the same advantages and possible variations as for the operator control device.

A further aspect relates to a motor vehicle having an operator control device according to one of the preceding embodiments.

A control device for the motor vehicle includes a processor apparatus configured to carry out an embodiment of the method. For this purpose, the processor apparatus may comprise at least one microprocessor and/or at least one microcontroller and/or at least one FPGA (field programmable gate array) and/or at least one DSP (digital signal processor). Furthermore, the processor apparatus may comprise program code configured to carry out the embodiment of the method upon execution by the processor apparatus. The program code may be stored in a data memory of the processor apparatus.

Developments of the method corresponding to features that have already been described in connection with the developments of the operator control device will not be described again here.

The motor vehicle is embodied in the form of a motorized vehicle, in particular a passenger car or truck, or as a minibus or motorcycle.

Combinations of the features of the described embodiments are also included.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
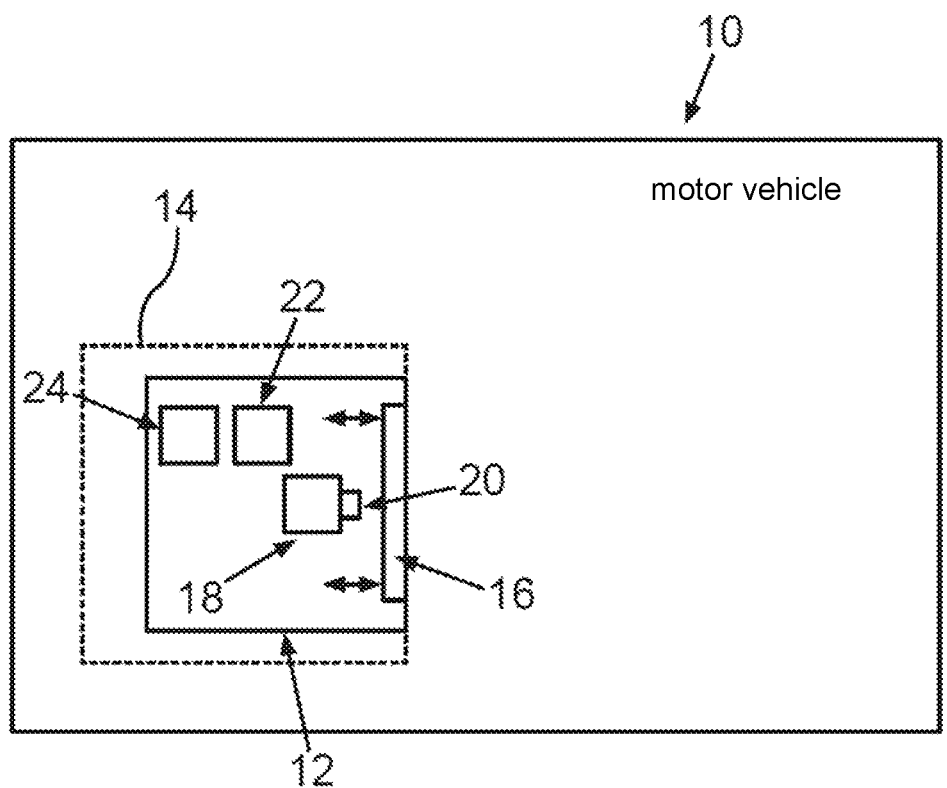
FIG. 1 is a block diagram of a motor vehicle having an operator control device according to an illustrative embodiment.

In the exemplary embodiments, the described components of the embodiments each represent individual features that should be considered independently of one another and be developed in each case independently of one another. The disclosure is therefore also intended to include combinations of the features of the embodiments other than those illustrated. Furthermore, the described embodiments may also be supplemented by further features that have already been described.

In the figures, identical reference characters each denote elements of identical function.

FIG. 1 shows a motor vehicle 10 having an operator control device 12 according to an illustrative embodiment. The operator control device 12 may be provided for operating an infotainment system 14 of the motor vehicle 10. The infotainment system 14 may be, for example, a vehicle computer that is able to provide vehicle-specific functions, such as telephony functions, navigation functions, air conditioning functions and entertainment functions.

The operator control device 12 may have a touch-sensitive display device 16, that is to say a combined input and output unit on which at least one graphical control element may be displayed that allows functions assigned to the graphical control element to be controlled. Functions assigned to the graphical control element may include the aforementioned functions of the infotainment system, for example. The touch-sensitive display device 16 may be an inductive or capacitive touchscreen.

The touch-sensitive display device 16 may be mounted in the operator control device 12 so as to be movable. This means that the touch-sensitive display device 16 may not be firmly fixed to a surface of the operator control device 12, but rather includes guide rails on the sides, for example, allowing the touch-sensitive display device 16 to be moved into a housing of the operator control device 12. Advantageously, the touch-sensitive display device 16 as a whole is able to be shifted to a plane that is parallel behind the original position. By way of example, a movement may cover a distance of one to ten millimeters, in particular two millimeters.

This distance may be sufficient to move the touch-sensitive display device 16 onto or against an actuating element 18 during an actuating action, i.e. during pressing. By way of example, the actuating element 18 may comprise a pushbutton 20, in particular a micro-pushbutton 20. By moving the touch-sensitive display device 16 in the direction of the actuating element 18, the micro-pushbutton 20 may be depressed or, in other words, activated. In this case, the actuating element 18 may provide a silent haptic actuating effect. This means that a user feels a resistance during the actuating action when the pushbutton 20 is depressed, but no audible signal, such as an audible click, occurs. This is advantageous because a user haptically feels that an actuating action has been carried out, but an audible signal is not supposed to occur until the actuating action has been successful.

If the actuating element 18 is activated, a signal can be sent to a control unit 22, which can then check whether an actuation position of the actuating action on the touchsensitive display device 16 matches a display position of the at least one graphical control element. This means that the point at which a user pressed the touchscreen is detected, and whether there is a graphical control element at this point. When this is the case, the control unit 22 can actuate an audio device 24 to output an audible signal. In particular, the audio device 24 may be a loudspeaker that plays back an audible click, for example. A user may thus be provided with audible feedback that the graphical control element has been pressed as a result of his actuating action. In addition, besides the audible signal, the function assigned to the graphical control element may also be performed by the infotainment system 14. This has the advantage that a user does not have to take his eyes off a road when operating the operator control device 12 while driving the motor vehicle 10, allowing safety while driving to be improved.

In addition, the control unit 22 may actuate the audio device 24 even when the actuation position has not been found to match the display position, but in this case in such a way that an audible error signal is output by the audio device 24. In particular, the audible error signal may differ from the audible signal that occurs when there is a match, with the result that a user is provided with audible feedback when the user has clicked beside the graphical control element.

The actuating element 18 may also be designed to detect a strength of the actuating action. This means, for example, that the actuating element 18 may be used to measure the pressure with which a user presses the touch-sensitive display device 16 onto the actuating element 18. For this purpose, the pushbutton 20 may be multi-stage, for example, in which a mechanical resistance may be between each stage. Alternatively, an electronic pressure sensor may measure a force curve for the actuating action. This measured pressure may then be provided by the actuating element 18 as a pressure-dependent control signal.

The pressure-dependent control signal may be used to adjust the function assigned to the graphical control element depending on the force used for the actuating action, for example, a volume of the audio device 24 additionally being able to be adjusted so that, for example, the volume of the audible signal is also increased when the pressure is high.

The operator control device 12 provides an inexpensive and efficient method for operating the infotainment system 14. In addition, when using the operator control device 12 in the vehicle 10, for example, it is advantageous that the infotainment system 14 is able to be controlled without having to take one's eyes off the road. A driver of the vehicle 10 is provided with haptic feedback for the actuating action and with audible feedback for a successful actuating action, as a result of which the safety of the driver may also be increased.

Figure 2:
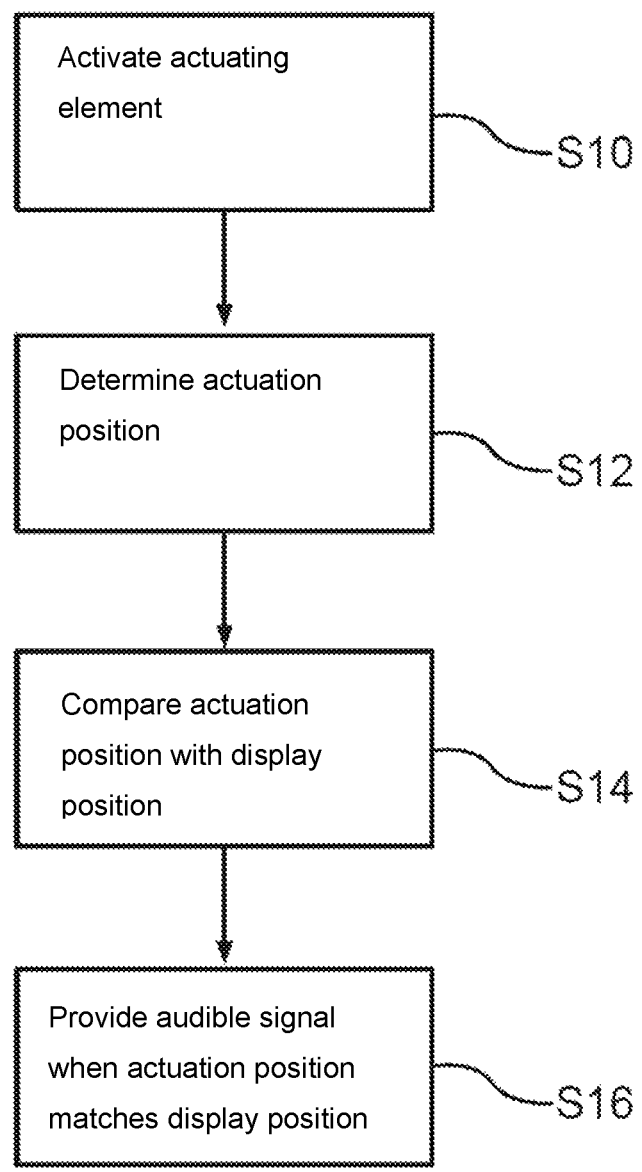
FIG. 2 is a process diagram according to an illustrative embodiment.

A process diagram for providing an audible signal for an operator control device 12 is shown in FIG. 2. In this exemplary embodiment, the operator control device 12 includes a touch-sensitive display device 16, which is mounted so as to be movable and is to display at least one graphical control element.

In a step S10, an actuating element is activated by moving the touch-sensitive display device during an actuating action. In a step S12, an actuation position of the actuating action during activation of the actuating element on the touch-sensitive display device 16 is determined. In a step S14, the actuation position is then compared with a display position of the at least one graphical control element. Finally, in a step S16, an audible signal is provided when the result of the comparison of the actuation position with the display position is that the actuation position and the display position match each other.

In another illustrative embodiment, one aspect is that a display (touch-sensitive display device 16) is suspended so as to be minimally movable. A silent micro-pushbutton 20 is located behind the display or touchscreen 16. When the touchscreen 16 is actuated, this micro-pushbutton 20 is pressed. The actuating force can therefore be determined. The switching force of the micro-pushbutton 20 is necessary for a signal. At the same time, the pushbutton 20 can produce a haptic actuating effect.

The touch sensor system (control unit 22) simultaneously determines the position of the actuation, i.e. of the finger on the touchscreen. When an actuable element (graphical control element) is displayed at the actuated position, an audible click (audible signal) occurs via loudspeakers (audio device 24).

Should the user press another area (for example the edge), the silent micropushbutton 20 may also switch, but there is no audible click. The audible feedback is thus provided selectively only when the pushbutton 20 has been actuated and an actuatable element (graphical control element) is also displayed at this point.

Since the haptic feeling is heavily influenced by the acoustics, the user senses a pushbutton confirmation much more intensely when the user hears an audible signal at the same time. This effect can be exploited to change a perceived intensity when a graphical control element is actuated or an area with no function. In addition, the user is able to clearly distinguish whether or not a function assigned to the graphical control element has been triggered. The triggering of a function can be confirmed with an audible click. There is no audible click when the area with no function is pressed.

This is advantageous because distraction can be reduced while driving, since a user is intuitively able to distinguish whether the user has actuated a graphical element on the touchscreen or whether the user has inadvertently pressed beside the element. Furthermore, the operator control device 12 described is significantly cheaper than other complex solutions.

Overall, the examples show a method for generating a situational audible click for a haptic touchscreen.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An operator control device for operating an infotainment system, comprising:
   an actuating element;
   a touch-sensitive display device, mounted to be movable, configured to display at least one graphical control element and to move during an actuating action to activate the actuating element, the touch-sensitive display device to incline about an axis of inclination in a direction of the actuating element;
   an audio device; and
   a control unit configured to determine an actuation position of the actuating action on the touch-sensitive display device when the actuating element is activated and to compare said actuation position with a display position of the at least one graphical control element, and to actuate the audio device to output an audible signal when the actuation position matches the display position.

2. The operator control device as claimed in claim 1, wherein the actuating element is configured to provide a silent haptic actuating effect.

3. The operator control device as claimed in claim 2, wherein the actuating element comprises a pushbutton.

4. The operator control device as claimed in claim 2, wherein the actuating element comprises a micro-pushbutton.

5. The operator control device as claimed in claim 4, wherein the actuating element is configured to measure a pressure caused by the actuating action and to generate a pressure-dependent control signal, and wherein the audio device to adjust a volume of the audible signal based on the pressure-dependent signal.

6. The operator control device as claimed in claim 5, wherein the control unit is configured to actuate the audio device to output an audible error signal when the actuation position does not match the display position when the actuating element is activated.

7. The operator control device as claimed in claim 6, wherein the control unit is configured to actuate the infotainment system to perform a function assigned to the graphical control element when the actuating element is activated and when the actuation position matches the display position.

8. The operator control device as claimed in claim 7, wherein the actuating element is configured to measure a pressure caused by the actuating action and to generate a pressure-dependent control signal, and the control unit is configured to actuate the infotainment system to perform a function assigned to the graphical control element based on the pressure-dependent control signal.

9. The operator control device as claimed in claim 1,
   wherein the actuating element is configured to measure a pressure caused by the actuating action and to generate a pressure-dependent control signal, and
   wherein the audio device is configured to adjust a volume of the audible signal based on the pressure-dependent signal.

10. The operator control device as claimed in claim 9, wherein the control unit is configured to actuate the infotainment system to perform a function assigned to the graphical control element when the actuating element is activated and when the actuation position matches the display position and based on the pressure-dependent control signal.

11. The operator control device as claimed in claim 1, wherein the control unit is configured to actuate the audio device to output an audible error signal when the actuation position does not match the display position when the actuating element is activated.

12. The operator control device as claimed in claim 1, wherein the control unit is configured to actuate the infotainment system to perform a function assigned to the graphical control element when the actuating element is activated and when the actuation position matches the display position.

13. A method for providing an audible signal for an operator control device with a touch-sensitive display device, mounted to be movable and to display at least one graphical control element, the method comprising:
   activating an actuating element by moving the touch-sensitive display device during an actuating action, the touch-sensitive display device being movably inclined about an axis of inclination in the direction of the actuating element;
   determining an actuation position of the actuating action when the actuating element is activated on the touch-sensitive display device;
   comparing the actuation position with a display position of the at least one graphical control element; and
   providing an audible signal when the result of the comparing is that the actuation position matches the display position.

14. The method as claimed in claim 13, wherein said activating of the actuating element provides a silent haptic actuating effect.

15. The method as claimed in claim 14, further comprising:
measuring, by the actuating element, a pressure caused by the actuating action, and
generating a pressure-dependent control signal, and
adjusting by the audio device a volume of the audible signal based on the pressure-dependent signal.

16. The method as claimed in claim 15, further comprising actuating, by the control unit, the infotainment system to perform a function assigned to the graphical control element when the actuating element is activated and when the actuation position matches the display position based on the pressure-dependent control signal.

17. The method as claimed in claim 14, further comprising actuating, by the control unit, the audio device to output an audible error signal when the actuation position does not match the display position when the actuating element is activated.

18. The method as claimed in claim 14, further comprising actuating, by the control unit, the infotainment system to perform a function assigned to the graphical control element when the actuating element is activated and when the actuation position matches the display position.

19. A motor vehicle, comprising:
a chassis; and
an operator control device
an actuating element,
a touch-sensitive display device mounted to be movable and configured to display at least one graphical control element and to move during an actuating action to activate the actuating element, the touch-sensitive display device to incline about an axis of inclination in a direction of the actuating element,
an audio device, and
a control unit configured to determine an actuation position of the actuating action on the touch-sensitive display device when the actuating element is activated and to compare said actuation position with a display position of the at least one graphical control element, and to actuate the audio device to output an audible signal when the actuation position matches the display position.

20. The motor vehicle as claimed in claim 19,
wherein the actuating element is configured to measure a pressure caused by the actuating action and to generate a pressure-dependent control signal, and
wherein the audio device is configured to adjust a volume of the audible signal based on the pressure-dependent signal.

* * * * *